Feb. 17, 1931.  A. E. ANDERSON  1,793,384
AUTOMATIC CONTROL SYSTEM
Filed Feb. 8, 1929
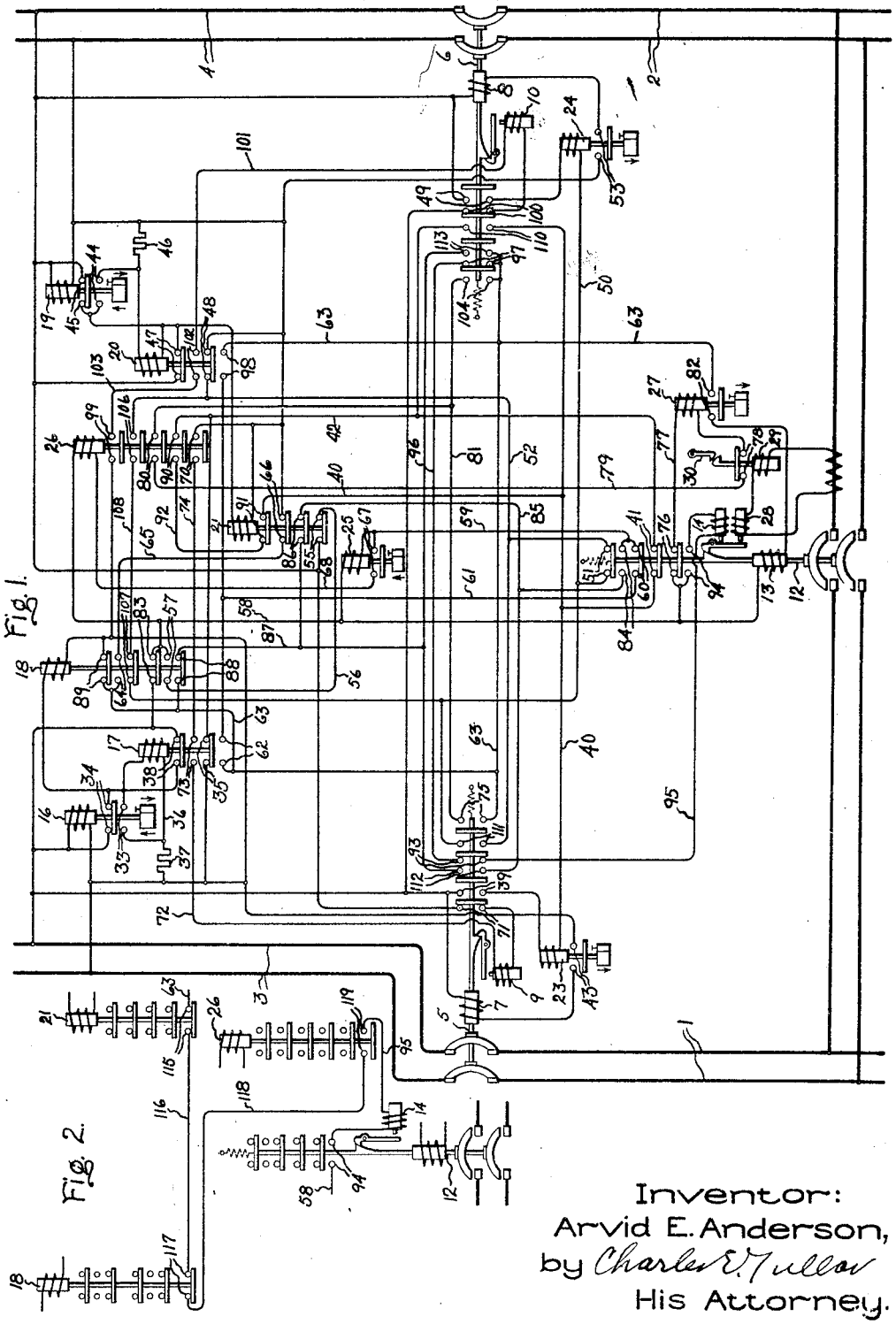
Inventor:
Arvid E. Anderson,
by Charles E. Tullar
His Attorney.

Patented Feb. 17, 1931

1,793,384

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

AUTOMATIC CONTROL SYSTEM

Application filed February 8, 1929. Serial No. 338,585.

My invention relates to automatic control systems for controlling the connections between a plurality of sources of current and a load circuit so that when the source which normally supplies the load circuit fails, another source is substituted therefor.

One object of my invention is to provide an arrangement for controlling the connections between two normally disconnected independently energized circuits so that they are connected together whenever the source supplying either circuit fails and for disconnecting the circuits from each other and for connecting the disconnected source to its respective circuit when the voltage of the disconnected source is restored to normal.

My invention will be better understood from the following description taken in connection with the accompanying drawing and its scope will be pointed out in the appended claims.

In the accompanying drawing Fig. 1 shows diagrammatically a control arrangement embodying my invention and Fig. 2 shows diagrammatically a modification of a portion of the arrangement shown in Fig. 1.

Referring to Fig. 1, 1 and 2 represent two independent electric circuits which are normally connected to supply circuits 3 and 4 by suitable switches 5 and 6 respectively. As shown in the drawing, switches 5 and 6 are circuit breakers of the well known latched-in type and are respectively provided with closing coils 7 and 8 and voltage trip coils 9 and 10.

In order that the circuits 1 and 2 may be connected together when either the supply circuit 3 or the supply circuit 4 fails, I provide a suitable tie breaker 12, such as a latched-in circuit breaker having a closing coil 13 and a voltage trip coil 14, between the circuits 1 and 2, and in accordance with my invention, I control the operation of the circuit breaker 12 so that it is closed when either of the supply circuits is deenergized for a predetermined length of time and is opened when both of the supply circuits have been simultaneously energized for a predetermined length of time. For accomplishing this result, I provide a time delay voltage relay 16 which is connected so that it is energized in response to the voltage across the circuit 3. When the voltage across the circuit 3 remains above a predetermined value for a predetermined time, the relay 16 effects the energization of the control relays 17 and 18 and when the voltage across the load circuit 3 remains below a predetermined value for a predetermined time, the relay 16 effects the deenergization of the control relays 17 and 18.

A similar time delay voltage relay 19 is connected across the supply circuit 4 and is arranged to effect the energization of the control relays 20 and 21 when the voltage across the supply circuit 4 remains above a predetermined value for a predetermined time and to effect the deenergization of the control relays 20 and 21 when the voltage across the supply circuit 4 remains below a predetermined value for a predetermined time.

When the control relay 17 is energized and the circuit breaker 5 is open, an energizing circuit is arranged to be completed for the control relay 23 associated with the circuit breaker 5 to effect the energization of the closing coil 7 and the closing of the circuit breaker 5. Similarly, when the control relay 20 is energized and the circuit breaker 6 is open, an energizing circuit is arranged to be completed for a control relay 24 associated with the circuit breaker 6 to effect the energization of the closing coil 8 and the closing of the circuit breaker 6.

In order to effect the opening of the circuit breaker 5 and the closing of the tie breaker 12 when the supply circuit 3 fails, the deenergization of the control relay 17 when the circuit breaker 12 is open effects the energization of a suitable time relay 25 which when energized for a predetermined length of time completes an energizing circuit for a control relay 26. When the control relay 26 is energized and the control relay 17 is deenergized, an energizing circuit is completed for the trip coil 9 to effect the opening of the circuit breaker 5. As soon as the circuit breaker 5 opens an energizing circuit is completed for a control relay 27 associated with the tie breaker 12. The control relay 27 when energized completes an energizing circuit for the closing coil 13 to close the tie breaker 12.

In order to effect the opening of the circuit breaker 12 and the closing of the circuit breaker 5 when the voltage of the supply circuit 3 is restored to normal after it has been disconnected from the circuit 1, the control relay 17, when energized, while the tie breaker 12 is closed and the circuit breaker 5 is open, is arranged to complete an energizing circuit for the time relay 25 which effects, after a predetermined time, the energization of the control relay 26. When the control relay 26 is energized while both of the control relays 17 and 21 are also energized, an energizing circuit is arranged to be completed for the control relay 23 to effect the energization of the closing coil 7 and the closing of the circuit breaker 5. As soon as the circuit breaker 5 recloses, an energizing circuit is completed for the voltage trip coil 14 to effect the opening of the tie breaker 12.

In order to effect the opening of the circuit breaker 6 and the closing of the tie breaker 12 when the supply circuit 4 fails, the deenergization of the control relay 20, while the circuit breaker 12 is open, effects the completion of an energizing circuit for the time relay 25 which after a predetermined time completes an energizing circuit for the control relay 26.

When the control relay 26 is energized and the control relay 20 is deenergized, an energizing circuit is arranged to be completed for the trip coil 10 to effect the opening of the circuit breaker 6. As soon as the circuit breaker 6 opens and an energizing circuit is completed for the control relay 27 to effect the energization of the closing coil 13 and the closing of the tie breaker 12.

In order to effect the opening of the tie breaker 12 and the reclosing of the circuit breaker 6 when the voltage of the supply circuit 4 is restored to normal after the circuit breaker 6 has been opened, the control relay 20 when reenergized is arranged to complete an energizing circuit for the time relay 25 which after a predetermined time completes an energizing circuit for the control relay 26. When both of the control relays 20 and 26 are simultaneously energized, an energizing circuit is completed for the control relay 24 to effect the energization of the closing coil 8 and the closing of the circuit breaker 6. As soon as the circuit breaker 6 closes an energizing circuit is completed for the voltage trip coil 14 to effect the opening of the tie breaker 12.

When the two circuits 1 and 2 are connected together and a fault occurs on the circuit whose normal source has failed it is desirable to disconnect the faulty circuit and maintain it disconnected from the normal circuit so that the fault does not affect the supply of current to the normal circuit. In the arrangement shown in the drawing, this result is obtained by providing the tie breaker 12 with the overcurrent trip coil 28 and the lockout relay 29 which are connected in any suitable manner so that they are energized in response to the current through the tie breaker 12. When an abnormal current flows through the tie breaker 12, the trip coil 28 effects the opening of the tie breaker and the lockout relay 29 is moved to its lockout position, in which position it maintains the circuit of the control relay 27 open so that the closing coil 13 cannot be energized to reclose the breaker. The lockout relay 29 is arranged in any suitable manner so that it remains in its lockout position when the operating coil of the relay is subsequently deenergized. As shown in the drawing, a manually controlled latch 30 is provided for holding the lockout relay in its lockout position.

The operation of the arrangement shown in the drawing is as follows: Let it be assumed that the circuit breakers 5, 6 and 12 are open and that the supply circuits 3 and 4 are simultaneously energized. After the supply circuit 3 has been energized for a predetermined length of time, the voltage relay 16 which is connected across the supply circuit 3 opens its contacts 33 and closes its contacts 34 thereby connecting the windings of the relays 17 and 18 across the supply circuit 3. A suitable resistor 37 is connected in series with the coil of the control relay 17. Control relay 17 by closing its contacts 38 completes a locking circuit for itself and for the control relay 18 which is independent of the contacts 34 of the voltage relay 16. Control relay 17 by closing its contacts 35 completes an energizing circuit for the control relay 23. This circuit is from one side of the supply circuit 3 through the auxiliary contacts 39 on the circuit breaker 5, winding of control relay 23, conductor 40, auxiliary contacts 41 on tie breaker 12 and auxiliary contacts 110 on circuit breaker 6 in parallel, conductor 42, contacts 35 of control relay 17 to the other side of the supply circuit 3. Control relay 23 by closing its contacts 43 connects the closing coil 7 across the supply circuit 3 so that the circuit breaker 5 closes and connects the supply circuit 3 to the circuit 1.

After the supply circuit 4 has been energized for a predetermined length of time the voltage relay 19 opens its contacts 44 and closes its contacts 45 thereby connecting the coils of the control relays 20 and 21 across the supply circuit 4. A resistor 46 is connected in series with the winding of the control relay 20. Control relay 20 by closing its contacts 47 completes a locking circuit for itself and the control relay 21 which is independent of the contacts 45 of the voltage relay 19.

Control relay 20 by closing its contacts 48 completes an energizing circuit for the control relay 24. This circuit is from one side of the supply circuit 4 through auxiliary contacts 49 on the circuit breaker 6, winding of control relay 24, conductor 50, auxiliary contacts 51 on tie breaker 12 and auxiliary contacts 111 on circuit breaker 5 in parallel, conductor 52, contacts 48 of control relay 20 to the other side of the supply circuit 4. Control relay 24 by closing its contacts 53 connects the closing coil 8 across the supply circuit 4 so that the circuit breaker 6 closes and connects the supply circuit 4 to the circuit 2.

Let it be assumed now that while the supply circuits 3 and 4 are connected respectively to the circuits 1 and 2, the supply circuit 3 fails so that the voltage relay 16 opens its contacts 34 and closes its contacts 33. The closing of the contacts 33 completes a short-circuit around the winding of the relay 17 so that this relay opens its contacts 38 and interrupts the circuit of the control relay 18. When both of the control relays 17 and 18 are in their deenergized position while the tie breaker 12 is open an energizing circuit is completed for the time relay 25. This circuit is from one side of the supply circuit 4 through the contacts 55 of control relay 21, conductor 56, contacts 57 of control relay 18, conductor 58, winding of time relay 25, conductor 59, auxiliary contacts 60 on tie breaker 12, conductor 61, contacts 62 of control relay 17, conductor 63, contacts 64 of control relay 18, conductor 65, contacts 66 of control relay 21 to the other side of the supply circuit 4. After a predetermined time, the relay 25 closes its contacts 67 and completes an energizing circuit for the control relay 26. This circuit is from one side of the supply circuit 4 through contacts 55 of control relay 21, conductor 56, contacts 57 of control relay 18, conductor 58, winding of control relay 26, conductor 68, contacts 67 of relay 25, conductor 59, contacts 60 of tie breaker 12, conductor 61, contacts 62 of control relay 17, conductor 63, contacts 64 of control relay 18, conductor 65, contacts 66 of control relay 21 to the other side of the supply circuit 4. Control relay 26 by closing its contacts 70 completes an energizing circuit for the trip coil 9 to open the circuit breaker 5. This energizing circuit is from one side of the supply circuit 4 through auxiliary contacts 71 on circuit breaker 5, trip coil 9, conductor 72, contacts 73 of control relay 17, conductor 74, contacts 70 of control relay 26 to the other side of the supply circuit 4. As soon as the circuit breaker 5 opens, its auxiliary contacts 75 complete an energizing circuit for the control relay 27. This energizing circuit is from one side of the supply circuit 4 through contacts 55 of relay 21, conductor 56, contacts 57 of control relay 18, conductor 58, auxiliary contacts 76 on tie breaker 12, conductor 77, winding of control relay 27, contacts 78 of lockout relay 29, conductor 79, contacts 80 of control relay 26, conductor 81, auxiliary contacts 75 on circuit breaker 5, conductor 63, contacts 64 of control relay 18, conductor 65, contacts 66 of control relay 21 to the other side of the supply circuit 4. Control relay 27, by closing its contacts 82, completes an energizing circuit for the closing coil 13 to close the tie breaker 12 so that the deenergized circuit 1 is connected to the energized circuit 2. The energizing circuit of the closing coil 13 is from one side of the supply circuit 4 through contacts 55 of the control relay 21, conductor 56, contacts 57 of control relay 18, conductor 58, closing coil 13, contacts 82 of control relay 27, conductor 63, contacts 64 of control relay 18, conductor 65, contacts 66 of control relay 21 to the other side of the supply circuit 4.

When the supply circuit 3 is reenergized so that the voltage thereof remains above a predetermined value for a sufficient length of time to allow the relay 16 to open its contacts 33 and close its contacts 34, the control relays 17 and 18 are reenergized. The control relay 18 by closing its contacts 83 and 89 completes an energizing circuit for the time relay 25 from one side of the supply circuit 3 through contacts 83 of control relay 18, conductor 58, winding of relay 25, conductor 59, auxiliary contacts 84 on tie breaker 12, conductor 85, contacts 86 on control relay 21 and auxiliary contacts 112 on circuit breaker 5 in parallel, conductor 87, contacts 88 of control relay 18, conductor 63, contacts 89 on control relay 18 to the other side of the supply circuit 3. After a predetermined time, the time relay 25 closes its contacts 67 and completes an energizing circuit for the control relay 26. This circuit is from one side of the supply circuit 3 through contacts 83 of control relay 18, conductor 58, winding of relay 26, conductor 68, contacts 67 of relay 25, conductor 59, auxiliary contacts 84 on tie breaker 12, conductor 85, contacts 86 of control relay 21 and auxiliary contacts 112 of circuit breaker 5 in parallel, conductor 87, contacts 88 of control relay 18, conductor 63, contact 89 of control relay 18 to the other side of the supply circuit. Relay 26, by closing its contacts 90, completes an energizing circuit for the control relay 23 associated with the circuit breaker 5. The energizing circuit for the control relay 23 is from one side of the supply circuit 3 through auxiliary contacts 39 on the circuit breaker 5, winding of control relay 23, conductor 40, contacts 91 of control relay 21, conductor 92, contacts 90 of control relay 26, conductor 42, contacts 35 of control relay 17 to the other side of the supply circuit 3. The control relay 23 by closing its contacts 43 connects the closing coil 7 across the supply circuit 3 so that the circuit breaker 5 closes and connects the supply circuit 3 to the circuit 1.

When the circuit breaker 5 closes its auxiliary contacts 93, an energizing circuit is completed for the trip coil 14 to effect the opening of the tie breaker 12 so that the circuit 1 is disconnected from the circuit 2. The energizing circuit for the trip coil 14 is from one side of the supply circuit 3 through contacts 83 of control relay 18, conductor 58, auxiliary contacts 94 on tie breaker 12, trip coil 14, conductor 95, auxiliary contacts 93 on circuit breaker 5, conductor 96, auxiliary contacts 97 on circuit breaker 6, conductor 63, contacts 89 of control relay 18 to the other side of the supply circuit 3.

Let it be assumed now that while the supply circuits 3 and 4 are connected respectively to the circuits 1 and 2, the voltage of the supply circuit 4 remains below a predetermined value for a predetermined time so that the control relay 19 opens its contacts 45 and closes its contacts 44. The closing of the contacts 44 completes a short-circuit around the winding of the control relay 20 so that this relay opens its contacts 47 in the energizing circuit of the control relay 21. Relay 20 by closing its contacts 98, completes an energizing circuit for the time relay 25. This circuit is from one side of the supply circuit 3 through contacts 83 of control relay 18, conductor 58, winding of relay 25, conductor 59, auxiliary contacts 60 on tie breaker 12, conductor 61, contacts 98 of control relay 20, conductor 63, contacts 89 of control relay 18 to the other side of the supply circuit 3. After the control relay 25 has been energized for a predetermined length of time, it closes its contacts 67 and completes an energizing circuit for the control relay 26. This circuit is from one side of the supply circuit 3 through contacts 83 of control relay 18, winding of relay 26, conductor 68, contacts 67 of relay 25, conductor 59, auxiliary contacts 60 on tie breaker 12, conductor 61, contacts 98 of control relay 20, conductor 63, contacts 89 of control relay 18 to the other side of the supply circuit 3. Relay 26 by closing its contacts 99 completes an energizing circuit for the trip coil 10 of the circuit breaker 6 to effect the opening of the circuit breaker 6 and the disconnection of the deenergized supply circuit 4 from the circuit 2. The energizing circuit for the trip coil 10 is from one side of the supply circuit 3 through auxiliary contacts 100 on circuit breaker 6, trip coil 10, conductor 101, contacts 102 of control relay 20, conductor 103, contacts 99 of control relay 26 to the other side of the supply circuit 3.

As soon as the circuit breaker 6 opens an energizing circuit is completed for the control relay 27 to effect the closing of the tie breaker 12. This energizing circuit is from one side of the supply circuit 3 through contacts 83 of control relay 18, conductor 58, auxiliary contacts 76 on tie breaker 12, conductor 77, winding of control relay 27, contacts 78 of lockout relay 29, conductor 79, contacts 80 of control relay 26, conductor 81, auxiliary contacts 104 on circuit breaker 6, conductor 63, contacts 89 of control relay 18 to the other side of the supply circuit 3. The closing of the contacts 82 of the control relay 27 completes an energizing circuit for the closing coil 13 to effect the closing of the circuit breaker 12 so that the deenergized circuit 2 is connected to the energized circuit 1. The energizing circuit for the closing coil 13 is from one side of the supply circuit 3 through contacts 83 of control relay 18, conductor 58, closing coil 13, contacts 82 of control relay 27, conductor 63, contacts 89 of control relay 18 to the other side of the supply circuit 3.

When the supply circuit 4 is reenergized and the voltage thereof remains above a predetermined value for a predetermined length of time, the voltage relay 19 opens its contacts 44 and closes its contacts 45 thereby connecting the windings of the control relays 20 and 21 across the supply circuit 4. The control relay 21 by closing its contacts 86 completes an energizing circuit for the time relay 25. This energizing circuit is from one side of the supply circuit 3 through contacts 83, of control relay 18, conductor 58, winding of relay 25, conductor 59, auxiliary contacts 84 on tie breaker 12, conductor 85, contacts 86 of control relay 21, conductor 87, contacts 88 of control relay 18, and auxiliary contacts 113 of open circuit breaker 6 in parallel, conductor 63, contacts 89 of control relay 18 to the other side of the supply circuit 3. After the time relay 25 has been energized for a predetermined length of time, it closes its contacts 67 and completes an energizing circuit for the control relay 26. This energizing circuit is from one side of the supply circuit 3 through contacts 83 of control relay 18, winding of control relay 26, conductor 68, contacts 67 of control relay 25, conductor 59, auxiliary contacts 84 on tie breaker 12, conductor 85, contacts 86 of control relay 21, conductor 87, contacts 88 of control relay 18, and auxiliary contacts 113 of open circuit breaker 6 in parallel, conductor 63, contacts 89 of control relay 18 to the other side of the supply circuit 3. Control relay 26 by closing its contacts 106 completes an energizing circuit for the control relay 24 to effect the closing of the circuit breaker 6. This energizing circuit is from one side of the supply circuit 4 through auxiliary contacts 49 on circuit breaker 6, winding of control relay 24, conductor 50, contacts 107 of control relay 18, conductor 108, contacts 106 of control relay 26, conductor 52, contacts 48 of control relay 20 to the other side of the supply circuit 4. Control relay 24, by closing its contacts 53, connects the closing coil 8 across the supply circuit 4 so that the circuit breaker 6 closes and connects the supply circuit 4 to the circuit 2.

As soon as the circuit breaker 6 closes its auxiliary contacts 97, an energizing circuit is completed for the trip coil 14 of the tie breaker 12 to effect the disconnection of the circuit 2 from the circuit 1. The energizing circuit for the trip coil 14 is from one side of the supply circuit 3 through the contacts 83 on control relay 18, conductor 58, auxiliary contacts 94 on tie breaker 12, trip coil 14, conductor 95, auxiliary contacts 93 on circuit breaker 5, conductor 96, auxiliary contacts 97 on circuit breaker 6, conductor 63, contacts 89 of control relay 18 to the other side of the supply circuit 3.

In case a fault occurs on the supply circuit 1 when it is receiving current through the tie breaker 12 from the supply circuit 4 or a fault occurs on the circuit 2 when it is receiving current through the tie breaker 12 from the supply circuit 3, the over current trip coil 28 effects the opening of the tie breaker 12 so that the faulty circuit is disconnected from the source of current connected thereto. At the same time the lockout relay 29 operates and opens its contacts 78 in the circuit of the coil of the control relay 27 so that the tie breaker 12 cannot be reclosed until the lockout relay has been manually reset.

In the arrangement shown in Fig. 1, a reenergized supply circuit is reconnected to its respective circuit before the tie breaker 12 is opened so that there is no interruption in the supply of current to a circuit when it is transferred from its auxiliary source to its normal source. Such an arrangement can be used only where the two supply circuits 3 and 4 are supplied by sources which are in synchronism. Where the sources 3 and 4 are supplied by sources which are not in synchronism it is necessary, when a supply circuit is reenergized, first to open the tie breaker 12 and then reconnect the reenergized supply circuit to its respective circuit. This result can be accomplished with the arrangement shown in Fig. 1 by omitting the contacts 90 and 91 and the conductor 92 in the circuit of the control relay 23, and the contacts 106 and 107 and the conductor 108 in the circuit of the control relay 24 and by substituting the contacts 115 of control relay 21, conductor 116, contacts 117 of control relay 18, conductor 118 and contacts 119 of control 26 in the circuit of the trip coil 14, as shown in Fig. 2, for the auxiliary contacts 97 on circuit breaker 6, conductor 96 and auxiliary contacts 93 on circuit breaker 5 shown in Fig. 1.

With the arrangement shown in Fig. 1 modified in the manner mentioned above, it will be observed that when a supply circuit is reenergized and has effected the energization of the control relay 26 in the manner heretofore described the closing of the contacts 119 of relay 26 completes an energizing circuit for the trip coil 14 to open the tie breaker 12 and disconnect the circuit 1 from the circuit 2. If the supply circuit 3 is the one which is reenergized the circuit breaker 12 by closing its contacts 41 then completes a circuit for the control relay 23 to effect the closing of circuit breaker 5 in the manner heretofore described. If the supply circuit 4 is the one which is reenergized and has effected the energization of the control relay 26 the tie breaker 12 by closing its auxiliary contacts 51 completes an energizing circuit for the control relay 24 to effect the closing of the circuit breaker 6 in the manner heretofore described.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:—

1. In combination, two normally disconnected load circuits, a separate supply circuit normally connected to each load circuit, and means responsive to the voltages of said supply circuits for effecting the connection of said load circuits together when the voltage across either of said supply circuits fails and for effecting the disconnection of said circuits when subsequently both of said supply circuits are simultaneously energized.

2. In combination, two normally disconnected load circuits, a separate supply circuit normally connected to each load circuit, and means responsive to the voltages of said supply circuits for effecting the disconnection of the deenergized supply circuit from its respective load circuit and the connection of said load circuits together when either of said supply circuits fails and for subsequently disconnecting said load circuits from each other and reconnecting the disconnected supply circuit to its respective load circuit when said disconnected supply circuit is restored to its normal energized condition.

3. In combination, two normaly disconnected load circuits, a circuit breaker for connecting said circuits together, a separate supply circuit normally connected to each load circuit, means responsive to the voltages of said supply circuits for effecting the disconnection of an abnormal supply circuit from its respective load circuit and the closing of said circuit breaker when a predetermined abnormal voltage condition occurs on either supply circuit and for effecting the reconnection of the disconnected supply circuit to its respective load circuit and the opening of said circuit breaker when the voltage of the disconnected supply circuit is restored to normal.

4. In combination, two normally disconnected load circuits, a circuit breaker for connecting said circuits together, closing coil for said circuit breaker, a separate supply circuit normally connected to each load circuit, and means responsive to the voltages of said supply circuits for effecting the disconnection of a deenergized supply circuit from its respective load circuit and the connection of said closing coil across the energized supply circuit when either of said supply circuits fails and for effecting the reconnection of the disconnected supply circuit to its respective load circuit and the opening of said circuit breaker when the voltage of the disconnected supply circuit is restored to normal.

5. In combination, two normally disconnected load circuits, a circuit breaker for connecting said circuits together, a closing coil for said circuit breaker, a separate supply circuit normally connected to each load circuit, and means responsive to the voltages of said supply circuits for effecting the disconnection of the abnormal supply circuit from its respective load circuit and the subsequent connection of said closing coil across the other of said supply circuits when either of said supply circuits fails and for effecting the opening of said circuit breaker and the reconnection of the disconnected supply circuit to its respective load circuit when the voltage of the disconnected supply circuit is subsequently restored to normal.

6. In combination, two normally disconnected load circuits, a circuit breaker for connecting said circuits together, a closing coil for said circuit breaker, a trip coil for said circuit breaker, a separate supply circuit normally connected to each load circuit, and means responsive to the voltages of said supply circuits for effecting the disconnection of the abnormal supply circuit from its respective load circuit and the subsequent connection of said closing coil across the other of said supply circuits when the voltage of either of said supply circuits remains below a predetermined value and for effecting the reconnection of the disconnected supply circuit and the energization of said trip coil when the voltage of the disconnected supply circuit remains above a predetermined value for a predetermined time.

7. In combination, two normally disconnected load circuits, a separate supply circuit for each load circuit, a circuit breaker between each supply circuit and its respective load circuit, a tie breaker between said load circuits, means responsive to the voltages of said supply circuits for effecting the opening of a circuit breaker between a supply circuit and its respective load circuit when the voltage of the supply circuit remains below a predetermined value for a predetermined time, means responsive to the opening of either of the circuit breakers between said supply circuits and the load circuits for effecting the closing of said tie breaker, and means responsive to the simultaneous energization of said supply circuits for effecting the opening of the tie breaker and the closing of the circuit breaker between the disconnected supply circuit and its respective load circuit.

8. In combination, two normally disconnected load circuits, a separate source of current for each load circuit, a circuit breaker between each source and its respective load circuit, a tie breaker between said load circuits, a closing coil for said tie breaker, means responsive to the voltages of said sources for effecting the opening of the circuit breaker between the abnormal source and its respective load circuit when the voltage of either of said sources remains below a predetermined value for a predetermined time, means responsive to the opening of either of said circuit breakers while the other is closed for effecting the connection of said closing coil across the source associated with the closed circuit breaker, and means responsive to the voltages of said sources for effecting the opening of said tie breaker and the closing of the circuit breaker between a disconnected source and its respective load circuit when the voltages of both of said sources remain above a predetermined value for a predetermined time.

9. In combination, two normally disconnected load circuits, a separate supply circuit normally connected to each load circuit, a time relay, means responsive to the voltages of said supply circuits for effecting the operation of said time relay when the voltage of either of said supply circuits remains below a predetermined value for a predetermined time while said load circuits are disconnected from each other, means controlled by said time relay when one of said supply circuits is deenergized for effecting the disconnection of the deenergized supply circuit from its respective load circuit and for effecting the connection of said load circuits together, means responsive to the voltages of said supply circuits for effecting the operation of said time relay when said load circuits are connected together and a disconnected source is reenergized, and means controlled by said time relay for effecting the reconnection of a reenergized disconnected source to its respective load circuit and the disconnection of said circuits from each other.

10. In combination, two normally disconnected load circuits, a separate supply circuit normally connected to each load circuit, a time relay, a normally open tie breaker between said load circuits, means responsive to the voltages of said supply circuits for effecting the operation of said time relay when said tie breaker is open and the voltage of either of said supply circuits remains below a predetermined value for a predetermined time, means responsive to the operation of said time relay when one of said supply circuits is deenergized for effecting the disconnection of the deenergized supply circuit and the closing of said tie breaker, means responsive to the voltages of said supply circuits for effecting the operation of said time relay when both of said supply circuits are energized while said tie breaker is closed, and means responsive to the operation of said time relay when said tie breaker is closed for effecting the reconnection of an energized disconnected supply circuit to its respective load circuit.

11. In combination, two normally disconnected load circuits, a separate supply circuit normally connected to each load circuit, a time relay, a normally open tie breaker between said load circuits, means responsive to the voltages of said supply circuits for effecting the operation of said time relay when said tie breaker is open and the voltage of either of said supply circuits remains below a predetermined value for a predetermined time, means responsive to the operation of said time relay when one of said supply circuits is deenergized for effecting the disconnection of the deenergized supply circuit and the closing of said tie breaker, means responsive to the voltages of said supply circuits for effecting the operation of said time relay when both of said supply circuits are energized while said tie breaker is closed, and means responsive to the operation of said time relay when said tie breaker is closed and both supply circuits are energized for effecting the opening of said tie breaker and the reconnection of a disconnected supply circuit to its respective load circuit.

12. In combination, two normally disconnected load circuits, a separate supply circuit normally connected to each load circuit, a circuit breaker between each supply circuit and its respective load circuit, means for effecting the opening of said circuit breaker between said supply circuits and said load circuits, a tie breaker between said load circuits, means responsive to the voltages of said supply circuits for effecting the closing of said tie breaker between said load circuits when either of said circuit breakers between said supply and load circuits is open and the supply circuit associated with the other circuit breaker is energized, and means responsive to a predetermined abnormal current through the tie breaker between said load circuits for effecting the opening thereof and for preventing the subsequent automatic reclosing thereof by said voltage responsive means.

13. In combination, two normally disconnected load circuits, a separate supply circuit normally connected to each load circuit, a circuit breaker between each supply circuit and its respective load circuit, means for effecting the opening of said circuit breakers between said supply circuits and said load circuits, a tie breaker between said load circuits, means responsive to the voltages of said supply circuits for effecting the closing of said tie breaker between said load circuits when either of said circuit breakers between said supply and load circuits is open and the supply circuit associated with the other circuit breaker is energized, and for effecting the subsequent reclosing of the open circuit breaker and the opening of the tie breaker between said load circuits when said supply circuits are simultaneously energized, and means responsive to a predetermined abnormal current through the tie breaker between said load circuits for effecting the opening thereof and for preventing the subsequent automatic reclosing thereof by said voltage responsive means.

14. In combination, two load circuits, two supply circuits, a circuit breaker for connecting one of said load circuits to one of said supply circuits, another circuit breaker for connecting the other load circuit to the other supply circuit, a third circuit breaker for connecting said load circuits together, and means responsive to the voltages of said supply circuits for effecting the closing of a circuit breaker associated with a supply circuit when the associated supply circuit is energized and for effecting the opening of a circuit breaker associated with a supply circuit when the associated supply circuit is deenergized and the other supply circuit is energized and for effecting the closing of said third circuit breaker when either of said supply circuits is deenergized while the other supply circuit is energized and the opening of said third circuit breaker when both of said supply circuits are simultaneously energized.

In witness whereof, I have hereunto set my hand this 7th day of February, 1929.

ARVID E. ANDERSON.